(12) United States Patent
Furihata et al.

(10) Patent No.: US 10,446,111 B2
(45) Date of Patent: Oct. 15, 2019

(54) IMAGE DATA TRANSFER SYSTEM, TRANSMITTER CIRCUIT AND RECEIVER CIRCUIT

(71) Applicant: Synaptics Japan GK, Tokyo (JP)

(72) Inventors: Hirobumi Furihata, Tokyo (JP); Masashige Harada, Tokyo (JP); Iori Shiraishi, Tokyo (JP); Takashi Nose, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 40 days.

(21) Appl. No.: 15/412,206

(22) Filed: Jan. 23, 2017

(65) Prior Publication Data

US 2017/0221448 A1 Aug. 3, 2017

(30) Foreign Application Priority Data

Jan. 29, 2016 (JP) .................................. 2016-015549

(51) Int. Cl.
*G09G 5/00* (2006.01)
*H04N 19/103* (2014.01)
(Continued)

(52) U.S. Cl.
CPC ............... *G09G 5/006* (2013.01); *G09G 3/20* (2013.01); *H04N 19/103* (2014.11); *H04N 19/426* (2014.11); *G09G 2310/027* (2013.01); *G09G 2330/021* (2013.01); *G09G 2340/02* (2013.01); *G09G 2360/18* (2013.01); *G09G 2370/08* (2013.01)

(58) Field of Classification Search
CPC .... G09G 5/006; G09G 3/20; G09G 2310/027; G09G 2330/021; G09G 2340/02; G09G 2360/18; G09G 2370/08; H04N 19/103; H04N 19/426
See application file for complete search history.

(56) References Cited

U.S. PATENT DOCUMENTS 4,534,055 A * 8/1985 Iinuma .................... H03M 7/40
704/206
5,999,272 A * 12/1999 Dow ...................... G06F 3/1297
358/1.1

(Continued)

FOREIGN PATENT DOCUMENTS

JP H08314589 A 11/1996

*Primary Examiner* — Chong Wu
(74) *Attorney, Agent, or Firm* — Patterson + Sheridan, LLP

(57) ABSTRACT

An image data transfer system includes a receiver and a transmitter configured to sequentially receive compressed image data and sequentially transmit transmission data corresponding to the compressed image data to the receiver. The transmitter is configured to, in transmitting a specific transmission data, perform data comparison of bits of a compressed image body data of a specific compressed image data with bits of a previous transmission data transmitted over signal lines allocated to the compressed image body data, incorporate the compressed image body data of the specific compressed image data or the bit-inverted data corresponding thereto into the specific transmission data, in response to the result of the data comparison, and incorporate the compression code of the specific compressed image data into the specific transmission data independently of the result of the data comparison.

20 Claims, 12 Drawing Sheets

(51) Int. Cl.
*H04N 19/426* (2014.01)
*G09G 3/20* (2006.01)

(56) References Cited

U.S. PATENT DOCUMENTS

| | | | | |
|---|---|---|---|---|
| 2002/0099924 | A1* | 7/2002 | Nishioka | G06F 9/30036 712/24 |
| 2008/0301256 | A1* | 12/2008 | McWilliams | G06F 12/0284 709/214 |
| 2009/0006687 | A1 | 1/2009 | Shibata | |
| 2012/0308149 | A1* | 12/2012 | Sengoku | H04N 1/648 382/237 |

* cited by examiner

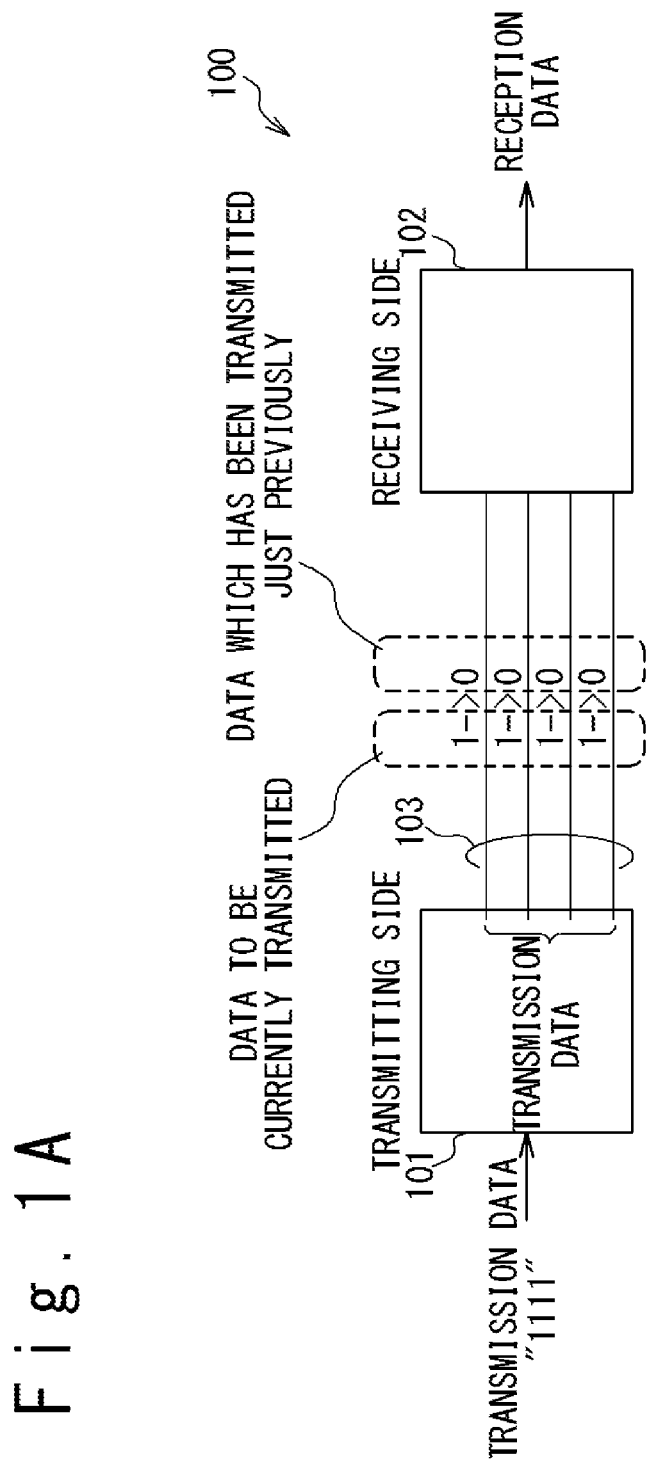

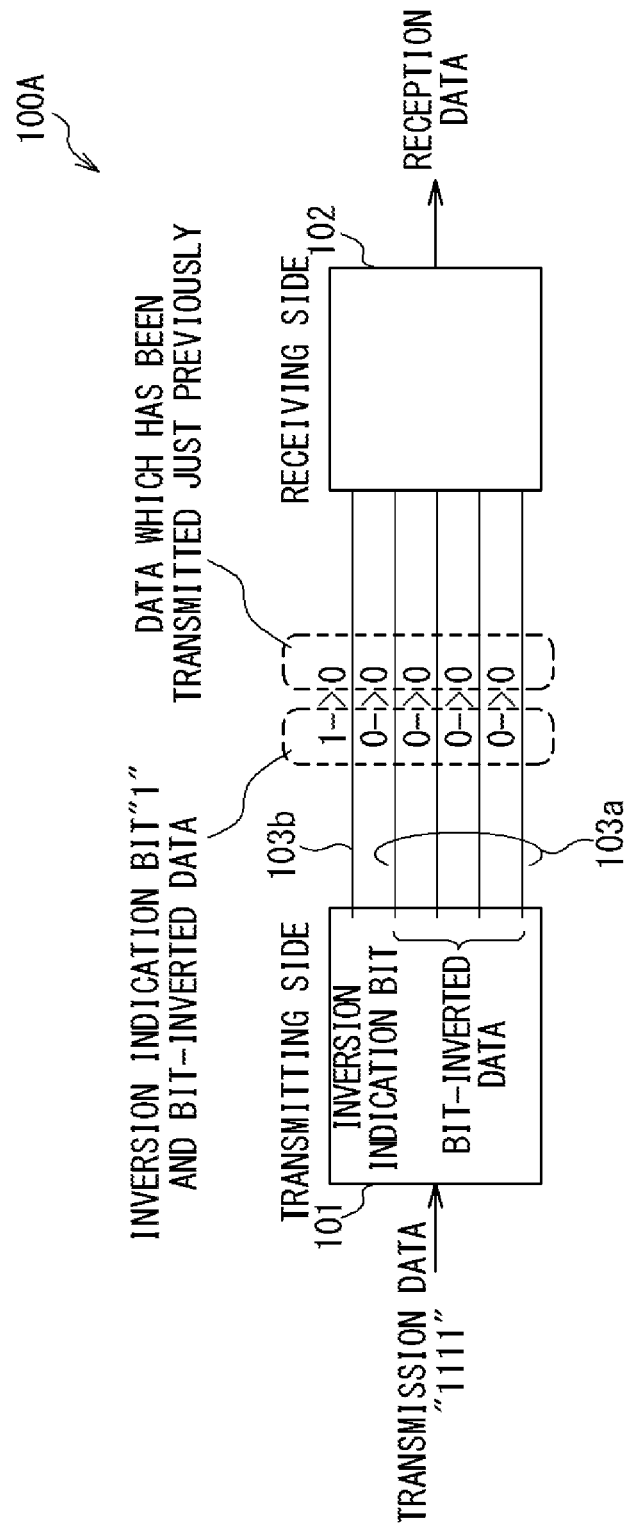

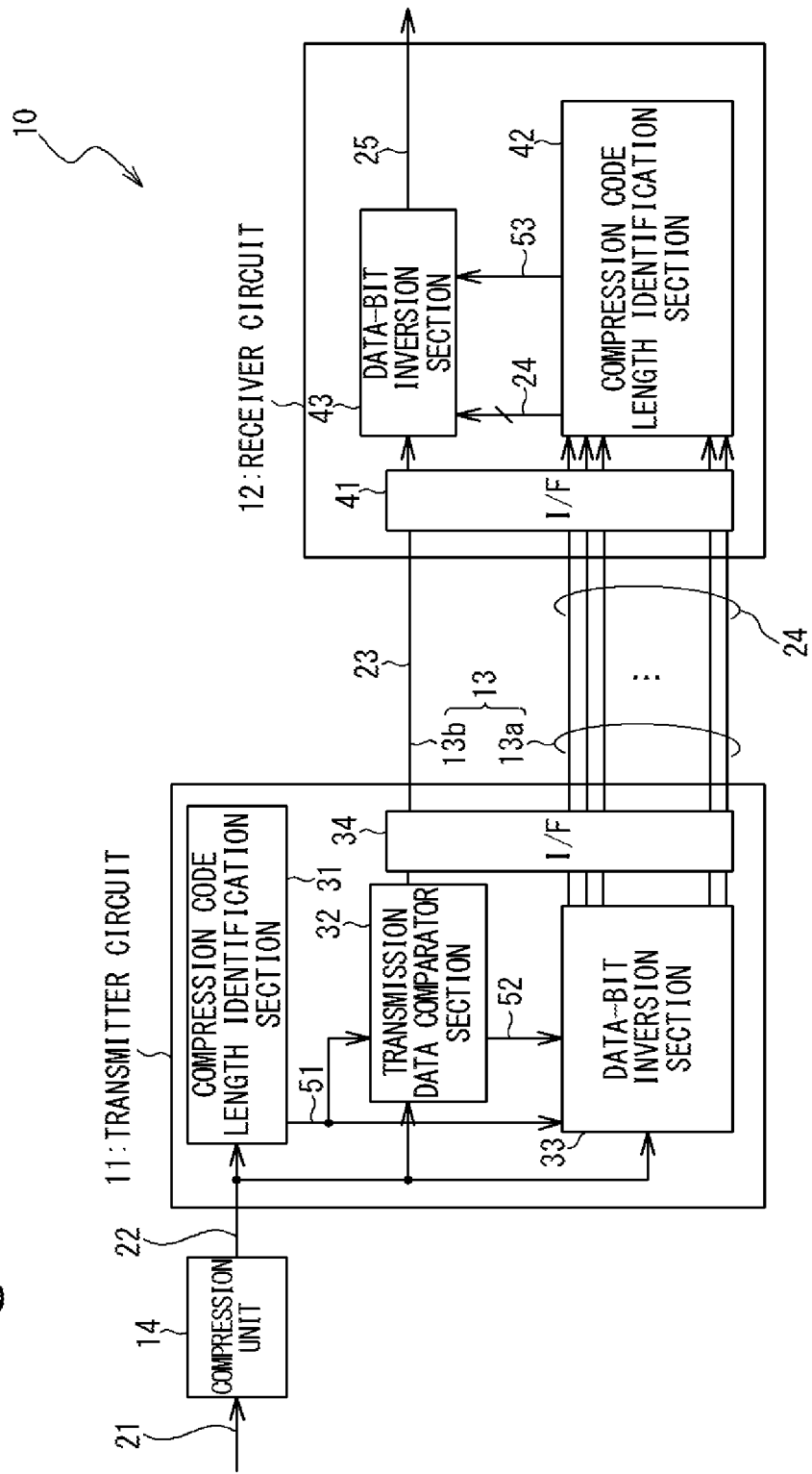

Fig. 4B

| | COMPRESSION CODE | COMPRESSION IMAGE BODY DATA |
|---|---|---|
| COMPRESSION PROCESS#1 | 0 | $D_{BODY}[0:62]$ (63BITS) |
| COMPRESSION PROCESS#2 | 10 | $D_{BODY}[0:61]$ (62BITS) |
| COMPRESSION PROCESS#3 | 110 | $D_{BODY}[0:60]$ (61BITS) |
| COMPRESSION PROCESS#4 | 111 | $D_{BODY}[0:60]$ (61BITS) |

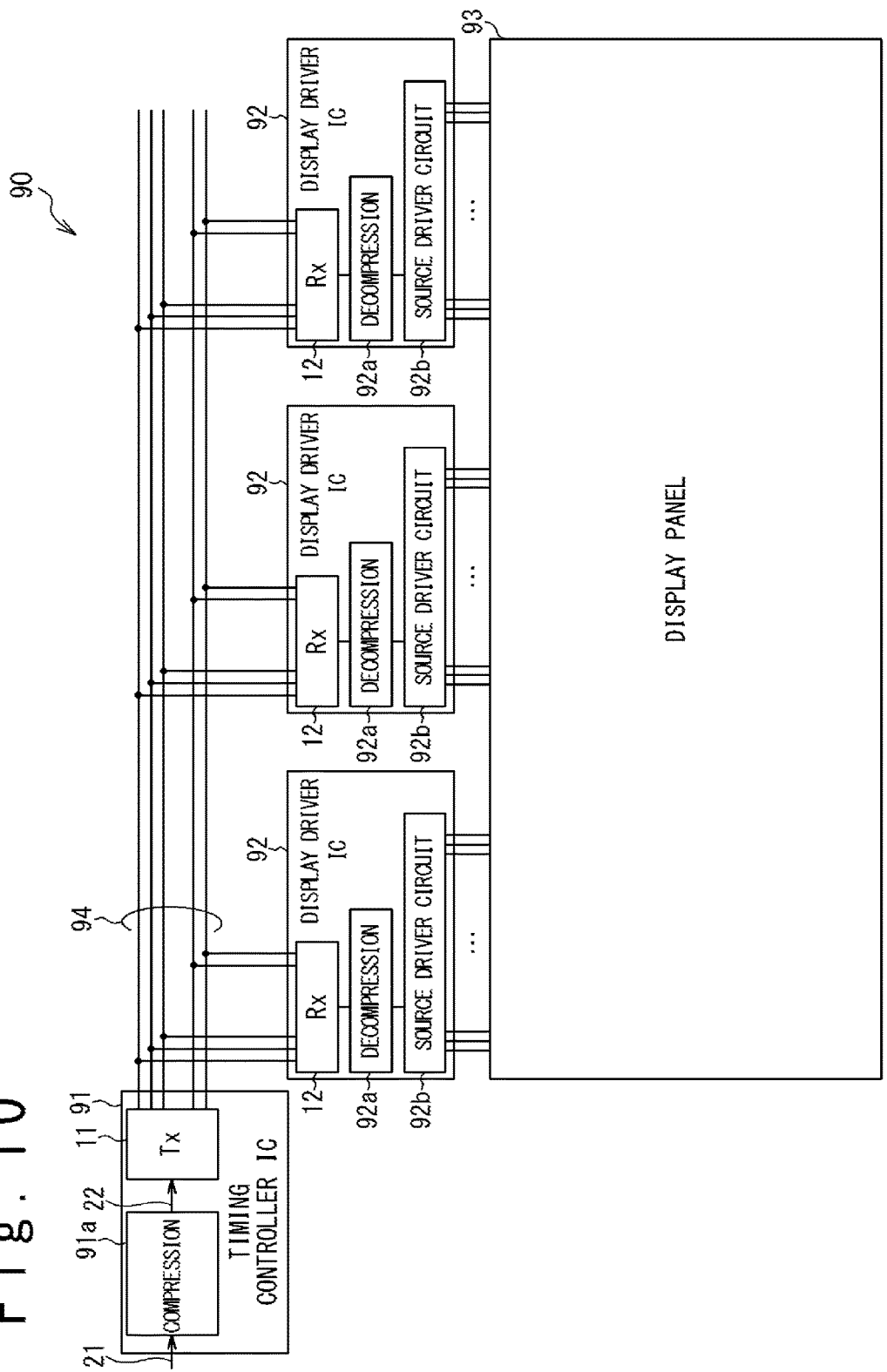

IMAGE DATA TRANSFER SYSTEM, TRANSMITTER CIRCUIT AND RECEIVER CIRCUIT

CROSS REFERENCE

This application claims priority to Japanese Patent Application No. 2016-015549, filed on Jan. 29, 2016, the disclosure of which is incorporated herein by reference in its entirety.

TECHNICAL FIELD

The present disclosure relates to an image data transfer system, transmitter circuit and receiver circuit.

BACKGROUND

The power consumption of recent semiconductor integrated circuits tends to increase more than ever due to their high functionalities. For example, recent display panel drivers suffer from a significant increase in the power consumption due to an increase in the number of pixels of display panels. Power consumption reduction is one of the most important issues of recent semiconductor integrated circuits.

It is known in the art that, although a semiconductor integrated circuit consumes power in various ways, a considerable percentage of the power consumption in a semiconductor integrated circuit is caused by switching the voltage levels on signal lines.

When binary data are transferred over a set of signal lines, the signal lines are repeatedly pulled up to the "high" level and pulled down to the "low" level. In this operation, the signal lines are repeatedly charged and discharged, and this causes considerable power consumption.

One known technique for reducing the power consumption caused by switching the voltage levels on the signal lines in transferring binary data is to transmit a bit-inverted data of a binary data of interest (that is, data obtained by bit-inversion of the bits of the binary data of interest), when more than half of the bits of the binary data to be currently transmitted are inverted from the corresponding bits of the previously-transferred binary data. Such technique is disclosed, for example, in Japanese Patent Application Publications Nos. H08-314589 A and 2009-9289 A.

However, there is room for further reducing the power consumption, when the above-described technique is used in transferring compressed image data.

SUMMARY

Therefore, an objective of the present disclosure is to provide a technique for reducing power consumption in transferring compressed image data. Other objectives and new features of the present disclosure would be understood by a person skilled in the art from the disclosure given below.

In one embodiment, an image data transfer system includes a receiver and a transmitter configured to sequentially receive compressed image data and sequentially transmit transmission data corresponding to the compressed image data to the receiver. Each of the compressed image data is generated through a selected compression process selected from a plurality of compression processes and includes a compression code indicating the selected compression process and a compressed image body data. Each of the transmission data includes the compression code included in the corresponding compressed image data and selected one of the compressed image body data of the corresponding compressed image data and a bit-inverted data obtained through bit-inversion on the compressed image body data of the corresponding compressed image data. The transmitter is configured to, in transmitting a specific one of the transmission data corresponding to a specific one of the compressed image data, perform data comparison of bits of the compressed image body data of the specific compressed image data with bits of a previous one of the transmission data which has just previously transmitted before the specific transmission data over signal lines allocated to the compressed image body data of the specific compressed image data or the bit-inverted data, incorporate the compressed image body data of the specific compressed image data or the bit-inverted data corresponding thereto into the specific transmission data, in response to the result of the data comparison, and incorporate the compression code of the specific compressed image data into the specific transmission data independently of the result of the data comparison.

In another embodiment, a transmitter circuit is provided which is configured to sequentially receive compressed image data and sequentially transmitting transmission data corresponding to the compressed image data. Each of the compressed image data is generated through a selected compression process selected from a plurality of compression processes and includes a compression code indicating the selected compression process and a compressed image body data. Each of the transmission data includes the compression code included in the corresponding compressed image data and selected one of the compressed image body data of the corresponding compressed image data and a bit-inverted data obtained through bit-inversion on the compressed image body data of the corresponding compressed image data. The transmitter circuit includes: a transmission data comparator section configured to, in transmitting a specific one of the transmission data corresponding to a specific one of the compressed image data, perform data comparison of bits of the compressed image body data of the specific compressed image data with bits of a previous one of the transmission data which has just previously transmitted before the specific transmission data over signal lines allocated to the compressed image body data of the specific compressed image data or the bit-inverted data corresponding thereto; and a data-bit inversion section configured to incorporate the compressed image body data of the specific compressed image data or the bit-inverted data corresponding thereto into the specific transmission data, in response to the result of the data comparison and incorporate the compression code of the specific compressed image data into the specific transmission data independently of the result of the data comparison.

In still another embodiment, a receiver circuit includes: an interface configured to externally and sequentially receive transmission data generated from compressed image data and inversion indication bits associated therewith; and a data-bit inversion section configured to sequentially receive the transmission data and output reception compressed image data respectively corresponding to the transmission data in response to the inversion indication bits. Each of the compressed image data is generated through a selected compression process selected from a plurality of compression processes and includes a compression code indicating the selected compression process and a compressed image body data. Each of the transmission data includes the compression code included in the corresponding compressed image data and selected one of the compressed image body data of the corresponding compressed image data and a bit-inverted data obtained through bit-inversion on the compressed image body data of the corresponding compressed image data. Each of the inversion indication bits indicates which of the compressed image body data of the corresponding compressed image data and the bit-inverted data corresponding thereto is included in the corresponding transmission data. The data-bit inversion section is configured to, in receiving a specific one of the transmission data, refer to the inversion indication bit associated with the specific transmission data, incorporate the compressed image body data included in the specific transmission data into the reception compressed image data corresponding to the specific transmission data when the specific transmission data includes the compressed image body data of the specific compressed image data, incorporate data obtained by performing bit-inversion on the bit-inverted data included in the specific transmission data into the reception compressed image data corresponding to the specific transmission data, when the specific transmission data includes the bit-inversion data of the compressed image body data of the specific compressed image data, and incorporate the compression code included in the specific transmission data into the reception compressed image data corresponding to the specific transmission data, independently of the corresponding inversion indication bit.

The present disclosure provides a technique for effectively reducing the power consumption in transmitting compressed image data.

BRIEF DESCRIPTION OF THE DRAWINGS

The above and other advantages and features of the present disclosure will be more apparent from the following description taken in conjunction with the accompanied drawings, in which:

FIG. 1A is a block diagram illustrating one example of a data transfer system;

FIG. 1B is a block diagram illustrating one example of a data transfer system configured to reduce power consumption in data transfer;

FIG. 3 is a block diagram illustrating an exemplary configuration of an image data transfer system in one embodiment;

FIG. 4B is a diagram schematically illustrating the format of compressed image data generated with respect to the respective blocks;

FIG. 10 is a block diagram illustrating an exemplary configuration of a display device in which the image data transfer system of the present embodiment is used to transmit compressed image data from a timing controller IC to display driver ICs.

DETAILED DESCRIPTION

Figure 2:
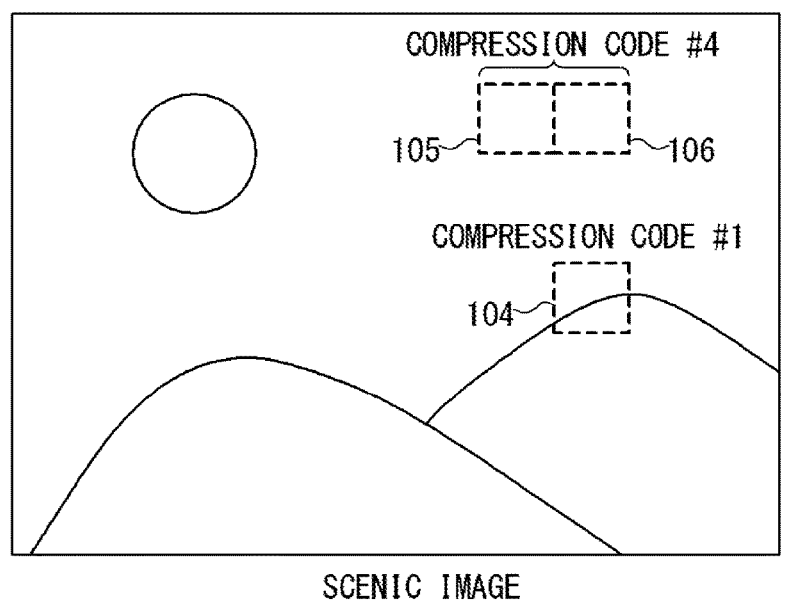
FIG. 2 is a diagram schematically illustrating one example of selection of compression processes with respect to an image.

The disclosure will be now described herein with reference to illustrative embodiments. A person skilled in the art would recognize that many alternative embodiments can be accomplished using the teachings of the embodiments and that the disclosure is not limited to the embodiments illustrated for explanatory purposes.

In the following, various embodiments are described with reference to the attached drawings. It should be noted that same or similar elements may be denoted by same or corresponding reference numerals in the following disclosure.

For ease of understanding of the present disclosure, a description is first given of power consumption in data transfer and reduction of the power consumption through data-bit inversion.

FIG. 1A is a block diagram illustrating one example of a data transfer system 100. A transmitting-side unit 101 and a receiving-side unit 102 are connected to each other by a set of signal lines 103. In the example illustrated in FIG. 1A, the number of the signal lines 103 is four and this implies four-bit transmission data are transmitted in parallel.

The data transfer system 100 thus configured may suffer from an increase in power consumption caused by switching of the voltage levels on the signal lines 103. When data "1111" is transferred just after data "0000" is transferred, for example, the voltage levels are switched on all of the signal lines 103 and this undesirably increases the power consumption.

One known technique for reducing power consumption caused by data transfer is to compare a transmission data to be currently transmitted with that which has been just previously transmitted and transmit bit-inverted data of the transmission data to be currently transmitted, when more than half of the bits are to be inverted. FIG. 1B is a block diagram illustrating an exemplary configuration of a data transfer system 100A which adopts this approach to reduce the power consumption.

In the data transfer system 100A illustrated in FIG. 1B, the transmitting-side unit 101 and the receiving-side unit 102 are connected to each other by a set of signal lines 103a and 103b. The signal lines 103a are used to transmit transmission data or bit-inverted data thereof and the signal line 103b is used to transmit an inversion indication bit. The inversion indication bit indicates which of the original transmission data and the bit-inverted data thereof is actually transferred over the signal lines 103a. Most typically, the bit-inverted data is transmitted when more than a half of the bits are to be inverted from the corresponding bits of the data which has been just previously transmitted.

When transmitting the bit-inverted data, the transmitting-side unit 101 sets the inversion indication bit to "1", for example, to notify the receiving-side unit 102 of the fact that the bit-inverted data is transmitted. When identifying that the inversion indication bit is "1", the receiving-side unit 102 reproduces the original data by inverting the respective bits of the data transmitted over the signal lines 103a to output the reproduced data as a reception data. When transmitting the original data without performing bit-inversion, the transmitting-side unit 101 sets the inversion indication bit to "0", for example. When identifying that the inversion indication bit is "0", the receiving-side unit 102 outputs the data transmitted over the signal lines 103a as the reception data without change.

When data "1111" is to be transmitted just after data "0000" has been transmitted, for example, the transmitting-side unit 101 sets the inversion indication bit to "1" and transmits to the receiving-side unit 102 a bit-inverted data of the data to be currently transmitted, since all the bits of the data to be currently transmitted are inverted from the corresponding bits of the data which has been just previously transmitted. The receiving-side unit 102 reproduces the original data by inverting the respective bits of the bit-inverted data received from the transmitting-side unit 101 and outputs the reproduced transmission data as the reception data. This operation effectively reduces the power consumption necessary for data transfer, since the number of the signal lines 103a on which the voltage levels are switched is reduced.

However, the approach illustrated in FIG. 1B may not be suitable for transmitting compressed image data, which are obtained through performing image compression on image data. In the following, a description is given of transfer of compressed image data.

One of the most typical processes performed on image data is block compression, in which image compression is performed in units of blocks. Each block consists of a predetermined number of pixels and is used as a unit of image compression. When block compression is performed, the compression process applied to each block may be selected on the basis of characteristics of the image data associated with the block. In this case, a compression code is described in the compressed image data to indicate the selected compression process.

In some cases, the same compression codes are often described in compressed image data associated with the adjacent blocks, because image data associated with adjacent blocks are often compressed with the same compression process. Therefore, it is possible to reduce the power consumption required for transferring compressed image data by making use of this fact.

FIG. 2 is a diagram schematically illustrating one example of selection of image compression processes. In compressing an image data associated with each block of an image, a compression process is selected on the basis of the characteristics of the image data associated with the block. In the example illustrated in FIG. 2, a compression process identified by compression code #1 is selected for a block 104 and a compression process identified by compression code #4 is selected for blocks 105 and 106.

Attention should be paid to the fact that image data associated with adjacent blocks often have similar characteristics due to the intrinsic nature of image data, and therefore the same compression process is often selected in compressing the image data associated with adjacent blocks. This implies that the same compression code is often repeatedly transmitted when compressed image data associated with adjacent blocks are sequentially transmitted.

Therefore, under such conditions, it is possible to reduce the number of the signal lines on which the voltage levels are switched to achieve power consumption reduction, by transmitting compressed image data as follows:

(1) For the compression code included in a compressed image data, the compression code is transmitted without performing data-bit inversion.

(2) For the compressed image body data, which is a data including bits of the compressed image data other than the compression code, the compressed image body data to be currently transmitted is compared with the data which has been just previously transmitted, and a selected one of the compressed image body data and the bit-inverted data thereof is transmitted on the basis of the comparison result.

In a conventional approach in which a selected one of the compressed image data itself and the bit-inverted data thereof is transmitted for all the bits of the compressed image data, data-bit inversion often occurs for the compression codes, although the compression codes used for adjacent blocks are actually same. This is not preferable for power consumption reduction. In the present embodiments, power consumption is effectively reduced in transferring compressed image data by performing the above-described operations (1) and (2). In the following, a description is given of a preferred embodiment of an image data transfer system which performs the above-described operations (1) and (2).

FIG. 3 is a block diagram illustrating an exemplary configuration of an image data transfer system 10 in one embodiment. The image data transfer system 10 of the present embodiment includes a transmitter circuit 11 and a receiver circuit 12. The transmitter circuit 11 and the receiver circuit 12 are connected each other by a set of signal lines 13. As described later, the signal lines 13 includes signal lines 13a used for transmitting a compressed image data 22 and a signal line 13b used for transmitting an inversion indication bit 23, which indicates whether or not data bit inversion is performed in transmitting the compressed image data 22. In the following, a data transmitted from the transmitter circuit 11 to the receiver circuit 12 over the signal lines 13a may be referred to as a transmission data 24.

The image data transfer system 10 of the present embodiment is configured to sequentially receive compressed image data 22 generated by performing image compression on image data 21 from a compression unit 14 and sequentially transfer transmission data 24 corresponding to the compressed image data 22 from the transmitter circuit 11 to the receiver circuit 12. A dedicated image compression circuit may be used as the compression unit 14 to generate the compressed image data 22. Alternatively, a processor, such as a CPU (central processing unit), an application processor, or a DSP (digital signal processor), may be used as the compression unit 14.

The compression unit 14 is configured to sequentially generate compressed image data 22 by performing block compression on image data 21 which are sequentially supplied to the compression unit 14. As described above, block compression is a compression method in which image data are compressed in units of blocks defined in the image of interest. Each block consists of a predetermined number of pixels.

Figure 4A:
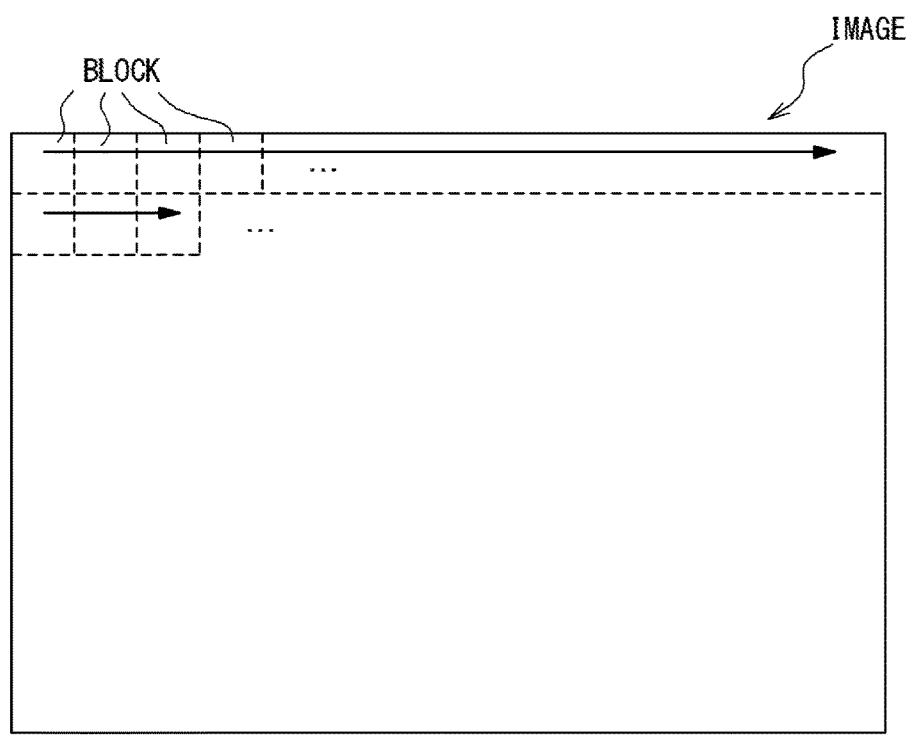
FIG. 4A is a diagram illustrating the format of image data supplied to a compression unit in the present embodiment.

FIG. 4A illustrates an exemplary format of the image data 21, which are supplied to the compression unit 14. A plurality of blocks, each consisting of a plurality of pixels, are defined in an image. Image data 21 associated with the respective blocks are sequentially supplied to the compression unit 14. For example, image data 21 associated with the blocks in the topmost row of the image are first transmitted in the order from left to right, and then image data 21 associated with the blocks in the second topmost row of the image are transmitted in the order from left to right. The same goes for the remaining rows. Image data 21 associated with the blocks in the respective rows are supplied to the compression unit 14 in the order from top to bottom.

When compressing the image data 21 associated with each block, the compression unit 14 selects a desired compression process from among a plurality of compression processes on the basis of the characteristics of the image data 21 associated with each block and performs the selected compression process on the image data 21 associated with each block to generate the corresponding compressed image data 22. This allows using suitable compression processes in accordance with the characterization of the image to generate compressed image data 22. In the following, the compression process used to generate the compressed image data 22 associated with a block (that is, the compression process selected to compress the image data 21 associated with the block) is referred to as the "selected compression process."

FIG. 4B is a diagram schematically illustrating the formats of the compressed image data 22 generated for the respective blocks. Illustrated in FIG. 4B are the formats of the compressed image data 22 generated through four types of compression processes #1 to #4.

In the present embodiment, the compressed image data 22 associated with each block is a 64-bit data and includes a compression code and a compressed image body data. The compression code indicates the selected compression process used to generate the compressed image data 22 associated with each block. The compressed image body data is the part of the compressed image data 22 other than the compression code and includes information corresponding to the image data 21 associated with each block.

In the present embodiment, the number of bits of the compression code, which may be hereinafter referred to as "compression code length", is variable depending on the selection of the compression processes (that is, depending on the selected compression process.) In the example illustrated in FIG. 4B, the one-bit compression code "0" is assigned to compression process #1, and the two-bit compression code "10" is assigned to compression process #2. Furthermore, the three-bit compression code "110" is assigned to compression process #3 and the three-bit compression code "111" is assigned to compression process #4. In a preferred embodiment, a compression process of a low compression ratio is selected for a low-redundancy image and a compression code with a short compression code length is assigned to the compression process of the low compression ratio, while a compression process of a high compression ratio is selected for a high-redundancy image and a compression code with a long compression code length is assigned to the compression process of the high compression ratio. This achieves image compression with preferred balancing between suppression of image quality deterioration and improvement of the compression ratio, even when there is a limitation on the number of bits of the compressed image data 22 associated with each block.

It should be noted that the allowed maximum number of bits of the compression codes and the value ("0" or "1") of the least significant bit of the compression codes for which the numbers of bits of the compression codes are less than the allowed maximum number of bits are preliminary defined for the compression codes illustrated in FIG. 4B. In this case, the compression code length of a compression code can be identified by sequentially identifying the values of the bits of the compression code from the most significant bit. For the compression codes illustrated in FIG. 4B, for example, the allowed maximum number of bits of the compression codes is defined as three and the value of the least significant bit of the compression codes for which the numbers of bits of the compression codes are less than the allows maximum number of bits is defined as "0". In this case, when the most significant bit of a compression code is "0", it is possible to identify that the compression code corresponds to compression process #1 and the compression code length is one. Furthermore, when the most significant bit of a compression code is "1" and the next most significant bit of the compression code is "0", it is possible to identify that the compression code corresponds to compression process #2 and the compression code length is two.

Referring back to FIG. 3, the transmitter circuit 11 sequentially receives compressed image data 22 from the compression unit 14 and sequentially transmits transmission data 24 corresponding to the compressed image data 22 to the receiver circuit 12. The "transmission data 24 corresponding to a compressed image data 22" referred to herein includes: the compression code included in the compressed image data 22; and a selected one of the compressed image body data included in the compressed image data 22 and a bit-inverted data obtained by performing data-bit inversion on the compressed image body data. Accordingly, the "transmission data 24 corresponding to a compressed image data 22" is at least equivalent to the compressed image data 22. The transmission data 24 corresponding to a compressed image data 22 may be identical to the compressed image data 22, but is not necessarily identical.

More specifically, the transmitter circuit 11 includes a compression code length identification section 31, a transmission data comparator section 32, a data-bit inversion section 33 and an interface 34.

The compression code length identification section 31 sequentially receives compressed image data 22 from the compression unit 14, identifies the compression code length of each of the received compressed image data 22 and transmits a compression code length signal 51 indicative of the identified compression code length to the transmission data comparator section 32 and the data-bit inversion section 33.

The transmission data comparator section 32 sequentially receives the compressed image data 22 from the compression unit 14, compares the transmission data 24 which has been just previously transmitted to the receiver circuit 12 over the signal lines 13*a* with the compressed image data 22 to be currently transmitted to the receiver circuit 12, and generates an inversion indication signal 52 on the basis of the result of the comparison, to instruct whether or not data bit inversion is to be performed on the compressed image body data. More specifically, the transmission data comparator section 32 operates as follows:

The transmission data comparator section 32 is configured to, each time when a transmission data 24 is transmitted to the receiver circuit 12, store the transmission data 24 or a data equivalent thereto. The transmission data 24 itself may be stored in the transmission data comparator section 32. Alternatively, the combination of the compressed image data 22 and the inversion indication bit 23 corresponding thereto may be stored in the transmission data comparator section 32; a transmission data 24 transmitted to the receiver circuit 12 can be reproduced from the compressed image data 22 and the inversion indication bit 23 corresponding thereto.

The transmission data comparator section 32 identifies the compression code length of the compression code included in the compressed image data 22 to be currently transmitted, from the compression code length signal 51 and specifies signal lines 13*a* to be used to transmit the compressed image body data of the compressed image data 22 to be currently transmitted or the bit-inverted data thereof. When the compression code length signal 51 indicates that the compression code length is three, for example, the transmission data comparator section 32 specifies that three of the signal lines 13a are to be used to transmit the compression code and the remaining signal lines 13a are to be used to transmit the compressed image body data or the bit-inverted data.

Furthermore, the transmission data comparator section 32 compares data bits of the transmission data 24, which has been transmitted over the signal lines 13a to be used to transmit the compressed image body data of the compressed image data 22 to be currently transmitted or the bit-inverted data thereof, with the compressed image body data of the compressed image data 22 to be currently transmitted. The transmission data comparator section 32 generates the inversion indication signal 52 to indicate whether or not data bit inversion is to be performed on the compressed image body data, in accordance with the result of this data comparison. The inversion indication signal 52 thus generated is transmitted to the data-bit inversion section 33.

Furthermore, the transmission data comparator section 32 generates the inversion indication bit 23 in accordance with the result of the data comparison. The inversion indication bit 23 indicates whether or not bit-inversion is performed on the compressed image body data in transmitting the transmission data; the inversion indication bit 23 is transmitted to the receiver circuit 12 as described later.

The data-bit inversion section 33 sequentially receives the compressed image data 22 from the compression unit 14 and generates transmission data 24 to be transmitted to the receiver circuit 12. As described above, the compressed image data 22 each include a compression code and a compressed image body data, and processing performed in the data-bit inversion section 33 is different between the compression code and the compressed image body data. The data-bit inversion section 33 incorporates the compression code into the corresponding transmission data 24 without bit-inversion, independently of the inversion indication signal 52 (that is, not depending on the result of the data comparison between the data which has been just previously transmitted to the receiver circuit 12 over the signal lines 13a and the compressed image data 22 to be currently transmitted to the receiver circuit 12.) As for the compressed image body data, on the other hand, the data-bit inversion section 33 is responsive to the inversion indication signal 52 for incorporating the compressed image body data into the transmission data 24 without bit-inversion, or incorporating the bit-inverted data obtained by bit-inversion of the compressed image body data into the transmission data 24.

In this operation, the data-bit inversion section 33 refers to the compression code length signal 51. The data-bit inversion section 33 identifies which part of the compressed image data 22 includes the compression code and which part of the compressed image data 22 includes the compressed image body data, from the compression code length indicated by the compression code length signal 51. When indicated to perform bit-inversion by the inversion indication signal 52, the data-bit inversion section 33 generates bit-inverted data by performing bit-inversion on the compressed image body data, and incorporates the bit-inverted data into the transmission data 24, together with the compression code included in the compressed image data 22. When not indicated to perform bit-inversion, the data-bit inversion section 33 incorporates the compressed image body data into the transmission data 24, together with the compression code included in the compressed image data 22. In this case, the compressed image data 22 itself is used as the transmission data 24. As a result, a transmission data 24 transmitted to the receiver circuit 12 includes a compression code, and also includes a compressed image body data or the bit-inverted data thereof. As is understood from the above-described discussion, the operation in which bit-inversion is not performed on the compression code effectively reduces the power consumption.

The interface 34 transmits the transmission data 24 received from the data-bit inversion section 33 to the receiver circuit 12 over the signal lines 13a, and further transmits the inversion indication bit 23 received from the transmission data comparator section 32 to the receiver circuit 12 over the signal line 13b.

The receiver circuit 12 includes an interface 41, a compression code length identification section 42 and a data-bit inversion section 43.

The interface 41 receives the transmission data 24 from the transmitter circuit 11 via the signal lines 13a and receives the inversion indication bit 23 via the signal line 13b.

The compression code length identification section 42 identifies the compression code length of each transmission data 24 and generates a compression code length signal 53 indicative of the identified compression code length. Additionally, the compression code length identification section 42 forwards the transmission data 24 to the data-bit inversion section 43.

The data-bit inversion section 43 reproduces the original compressed image data 22 from the transmission data 24 and outputs the reproduced compressed image data 22 as reception compressed image data 25. More specifically, the data-bit inversion section 43 identifies which part of a received transmission data 24 includes the compression code and which part of the received transmission data 24 includes the compressed image body data or the bit-inverted data, from the compression code length indicated by the compression code length signal 53. Furthermore, when recognizing that the transmission data 24 includes a compression code and a bit-inverted data from the inversion indication bit 23 received from the transmitter circuit 11, the data-bit inversion section 43 performs bit-inversion on the bit-inverted data to reproduce the original compressed image body data. In this case, the data-bit inversion section 43 outputs the reception compressed image data 25 so that the reception compressed image data 25 includes the compression code included in the transmission data 24 and the compressed image body data thus reproduced. When recognizing that the received transmission data 24 includes the compressed image body data of the original compressed image data 22, from the inversion indication bit 23 received from the transmitter circuit 11, on the other hand, the data-bit inversion section 43 incorporates the compressed image body data included in the transmission data 24 into the reception compressed image data 25. As for the compression code, the data-bit inversion section 43 incorporates the compression code included in the transmission data 24 into the reception compressed image data 25 without bit-inversion, independently of the value of the inversion indication bit 23. The reception compressed image data 25 output in this way from the data-bit inversion section 43 are identical to the corresponding compressed image data 22 supplied to the transmitter circuit 11 (as long as there is no communication error).

Next, a description is given of an exemplary operation of the image data transfer system 10 in the present embodiment.

Figure 5:
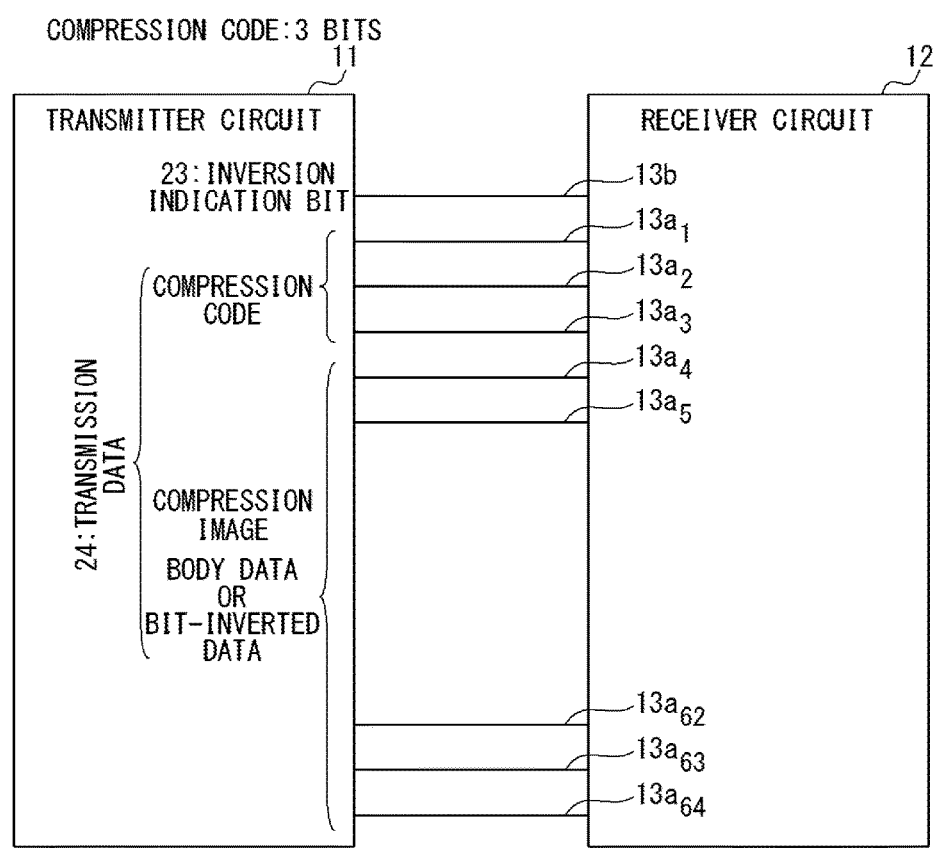
FIG. 5 is a diagram schematically illustrating allocation of signal lines in transmitting compressed image data in the image data transfer system of the present embodiment.

FIG. 5 is a diagram schematically illustrating an exemplary allocation of the signal lines 13 (13a and 13b) in transferring compressed imaged data 22 over the image data transfer system 10. In the present embodiment, transmission data 24 are transmitted over the signal lines 13a and the inversion indication bits 23 are transmitted over the signal line 13b. In the example illustrated in FIG. 5, the transmission data 24 are 64-bit data and therefore the transmission data 24 are transmitted with 64 signal lines 13a. If necessary for distinguishing the 64 signal lines 13a from one another, a suffix may be attached to the reference numeral "13a". The signal lines $13a_1$ to $13a_{64}$ respectively transmit corresponding bits of the transmission data 24.

Since the lengths of the compression codes included in transmission data 24 are variable, each of the signal lines 13a may be allocated to the compression code or a selected one of the compressed image body data and the bit-inverted data, depending on the compression code length. For example, FIG. 5 illustrates the allocation of the signal lines 13 in the case where the compression code length is "3". Three signal lines $13a_1$ to $13a_3$ are allocated to the compression code and the remaining signal lines $13a_4$ to $13a_{64}$ are allocated to the compressed image body data or the bit-inverted data thereof. As thus described, once the compression code length of the compression code of each transmission data 24 is given, it is possible to determine the signal lines 13a to be allocated to the compression code and those to be allocated to the compressed image body data or the bit-inverted data.

In the present embodiment, the transmitter circuit 11 transmits the transmission data 24 corresponding to the compressed image data 22 associated with a specific block as described below:

(1) In relation to the signal line(s) 13a allocated to the compression code, the transmitter circuit 11 transmits the compression code over the relevant signal line(s) 13a to the receiver circuit 12 without performing bit-inversion.

(2) As for the signal lines 13a allocated to the compressed image body data or the bit-inverted data, the transmitter circuit 11 compares the compressed image body data with the data which has been transmitted over the relevant signal lines 13a and transmits to the receiver circuit 12 the compressed image body data itself or the bit-inverted data thereof, depending the data comparison.

(3) Additionally, the transmitter circuit 11 transmits the inversion indication bit 23, which indicates which of the compressed image body data itself or the bit-inversion data thereof is transmitted, to the receiver circuit 12 over the signal line 13b.

When the compression code length is three as illustrated in FIG. 5, the signal lines $13a_1$ to $13a_3$ are allocated to the compression code and the signal lines $13a_4$ to $13a_{64}$ are allocated to the compressed image body data or the bit-inverted data thereof. In this case, the respective bits of the compressed image body data are compared with the corresponding bits of the data which has been just previously transmitted over the signal lines $13a_4$ to $13a_{64}$. The transmitter circuit 11 determines which of the compressed image body data itself and the bit-inverted data thereof is to be transmitted, depending on the result of the data comparison. Most typically, when more than half of the bits of the compressed image body data are inverted from the corresponding bits of the data which has been just previously transmitted over the signal lines $13a_4$ to $13a_{64}$, the bit-inverted data is incorporated into the transmission data 24. Otherwise, the compressed image body data is incorporated into the transmission data 24 without bit-inversion.

The receiver circuit 12 reproduces the original compressed image data 22 from the transmission data 24 received from the transmitter circuit 11, referring to the inversion indication bit 23. The original compressed image data 22 thus reproduced is output from the receiver circuit 12 as the reception compressed image data 25. More specifically, when recognizing from the inversion indication bit 23 that the compressed image body data is transmitted without data-bit inversion, the receiver circuit 12 incorporates the compression code and compressed image body data included in the transmission data 24 into the reception compressed image data 25 without performing data-bit inversion and outputs the reception compressed image data 25 thus generated. When recognizing from the inversion indication bit 23 that the bit-inverted data of the compressed image body data is transmitted, on the other hand, the receiver circuit 12 reproduces the original compressed image body data by performing data-bit inversion on the bit-inverted data, incorporates the compression code included in the transmission data 24 and the compressed image body data thus reproduced, into the reception compressed image data 25, and outputs the reception compressed image data 25 thus generated.

Figure 6:
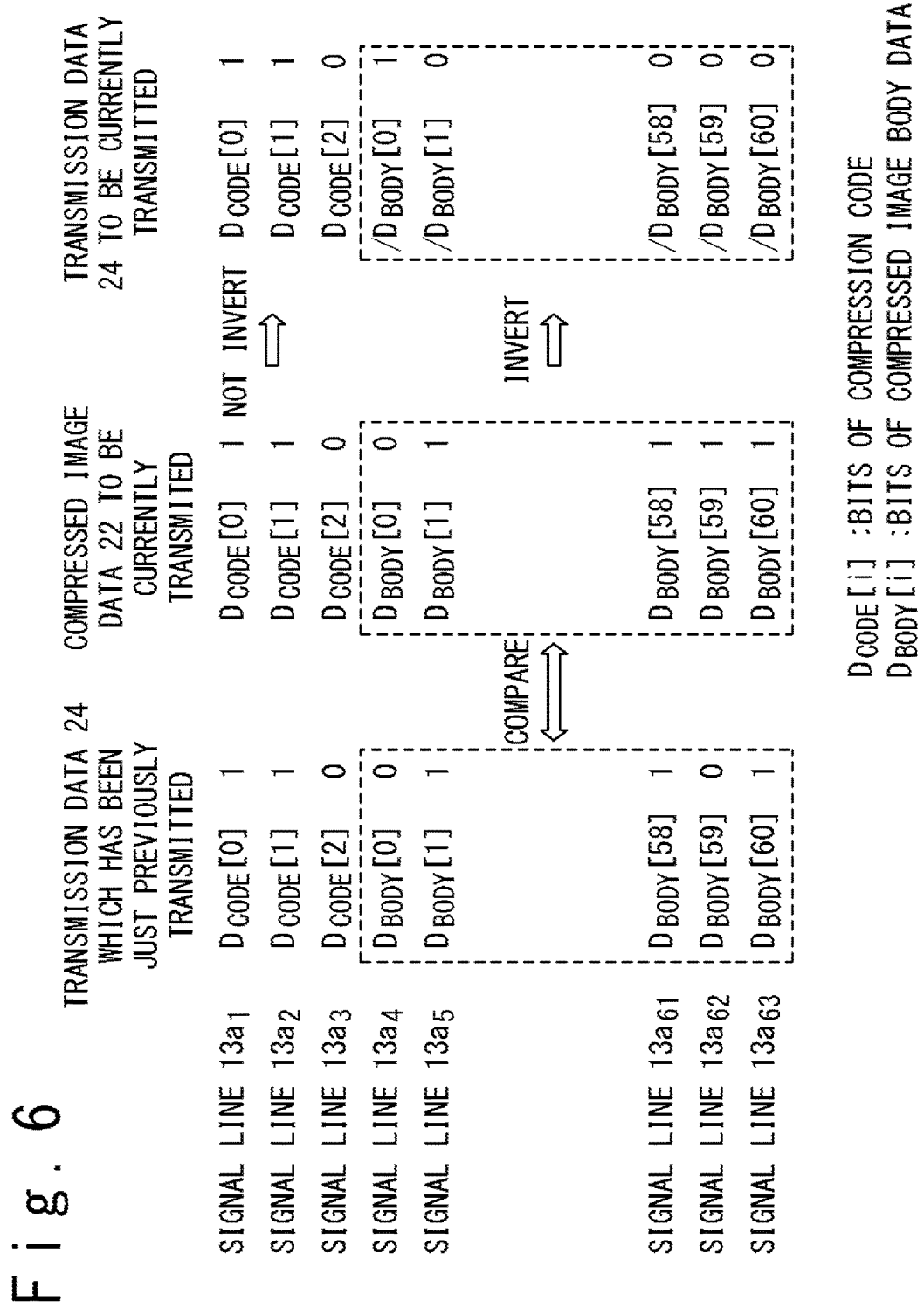
FIG. 6 is a diagram schematically illustrating one example of transmission of a transmission data in the image data transfer system of the present embodiment.

FIG. 6 illustrates one example of transmission of a transmission data 24. Illustrated in FIG. 6 is the case where the compression code length of the transmission data 24 which has been just previously transmitted is three and the compression code length of the compressed image data 22 to be currently transmitted is also three. In FIG. 6, the legend "$D_{CODE}[i]$" denotes a bit of the compression code, and the legend "$D_{BODY}[i]$" denotes a bit of the compressed image body data. In the following, a discussion is given of the case where, in just previous transmission of the transmission data 24, the bits $D_{CODE}[0]$ to $D_{CODE}[2]$ of the compression code have been transmitted over the signal lines $13a_1$ to $13a_3$ and the bits $D_{BODY}[0]$ to $D_{BODY}[60]$ of the compressed image body data have been transmitted over the signal lines $13a_4$ to $13a_{64}$. It should be noted that the bit $D_{CODE[i]}$ indicates a higher-order bit of the compression code as the parameter "i" is decreased.

When a compressed image data 22 to be currently transmitted is supplied to the transmitter circuit 11, the compression code length identification section 31 of the transmitter circuit 11 identifies the compression code length of the compressed image data 22. In the present embodiment, the compression code is defined as illustrated in FIG. 4B, and the compression code length identification section 31 identifies the compression code length by sequentially identifying the values of the bits of the compression code from the most significant bit. It should be noted that, in the definition of the compression code illustrated in FIG. 4B, the allowed maximum compression code length is three and the value of the least significant bit of the compression code for which the number of bits is less than the allowed maximum compression code length is "0". The compression code length identification section 31 identifies that the compression code length is three, since the most significant bit $D_{CODE}[0]$ and the next most significant bit $D_{CODE}[1]$ of the compression code are both "1". The compression code length signal 51 is transmitted to the transmission data comparator section 32 and the data-bit inversion section 33 to indicate the identified compression code length.

The transmission data comparator section 32 identifies the compression code length of the compressed image data 22 to be currently transmitted, on the basis of the compression code length signal 51, and specifies the signal lines 13a to be used for transmitting the compressed image body data or the bit-inverted data thereof, with respect to the transmission data 24 corresponding to the compressed image data 22 to be currently transmitted, on the basis of the identified compression code length. In the example illustrated in FIG. 6, since the compression code length of the compressed image data 22 to be currently transmitted is three, the transmission data comparator section 32 specifies the signal lines $13a_4$ to $13a_{64}$ as the signal lines to be used for transmitting the compressed image body data or the bit-inversion data thereof, with respect to the transmission of the corresponding transmission data 24.

Furthermore, the transmission data comparator section 32 compares the respective bits of the compressed image body data of the compressed image data 22 to be currently transmitted, with the corresponding bits of the transmission data 24 which has been just previously transmitted over the signal lines $13_{a4}$ to $13a_{64}$. The transmission data comparator section 32 generates the inversion indication signal 52 to indicate whether or not data-bit inversion is to be performed on the compressed image body data, in accordance with the result of this data comparison. The inversion indication signal 52 thus generated is transmitted to the data-bit inversion section 33. Additionally, the transmission data comparator section 32 transmits to the receiver circuit 12 the inversion indication bit 23, which indicates whether or not data-bit inversion is performed on the compressed image body data of the compressed image data 22 to be currently transmitted, via the interface 34.

The data-bit inversion section 33 identifies which part of the compressed image data 22 to be currently transmitted incorporates the compression code and which part of the same incorporates the compressed image body data from the compression code length indicated by the compression code length signal 51 received from the compression code length identification section 31. Furthermore, in response to the inversion indication signal 52, the data-bit inversion section 33 incorporates the compressed image body data into the transmission data 24 without performing data-bit inversion, or incorporates the bit-inverted data obtained through data bit-inversion of the compressed image body data into the transmission data 24. As for the compression code, on the other hand, the data-bit inversion section 33 incorporates the compression code into the transmission data 24 to be transmitted to the receiver circuit 12, without performing data-bit inversion, independently of the inversion indication signal 52.

In the example illustrated in FIG. 6, more than half of the bits of the compressed image body data of the compressed image data 22 to be currently transmitted are inverted from the corresponding bits of the transmission data 24 which has been just previously transmitted over the signal lines $13a_4$ to $13a_{64}$. Accordingly, the transmission data comparator section 32 determines that data-bit inversion is to be performed on the compressed image body data of the compressed image data 22 to be currently transmitted. The transmission data comparator section 32 instructs the data-bit inversion section 33 to perform data-bit inversion on the compressed image body data of the compressed image data 22 to be currently transmitted by using the inversion indication signal 52, and notifies the receiver circuit 12 of the fact that data-bit inversion is performed on the compressed image body data by using the inversion indication bit 23. The data-bit inversion section 33 transmits the compression code of the compressed image data 22 to the receiver circuit 12 over the signal lines $13a_1$ to $13a_3$ without performing data-bit inversion and also transmits the bit-inverted data obtained by performing data-bit inversion on the compressed image body data to the receiver circuit 12 over the signal lines $13a_4$ to $13a_{64}$.

Figure 7:
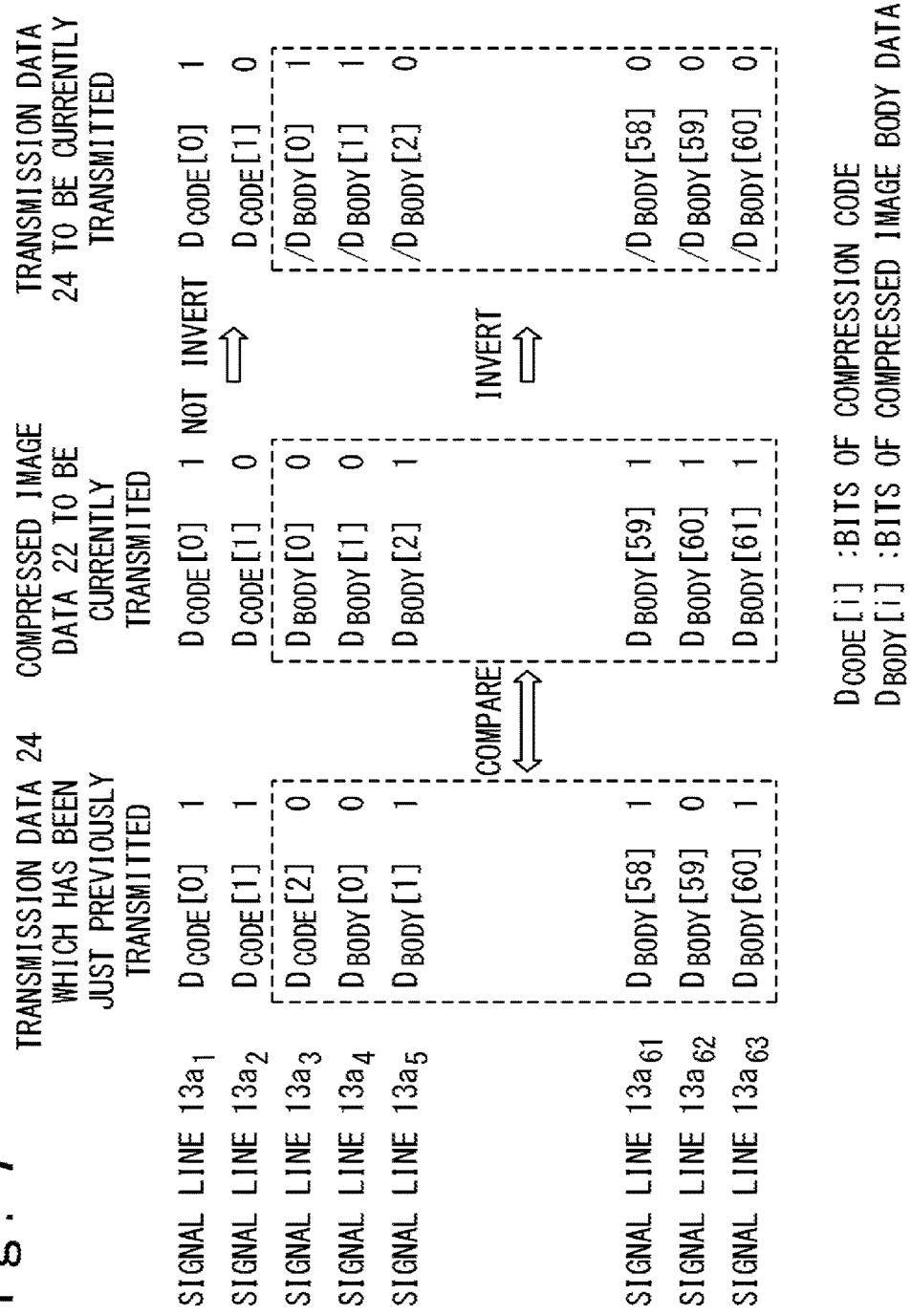
FIG. 7 is a diagram schematically illustrating another example of transmission of a transmission data in the image data transfer system of the present embodiment.

It should be noted that, although the compression code length of the compressed image data 22 to be currently transmitted is identical to that of the transmission data 24 which has been just previously transmitted in the example illustrated in FIG. 6, the compression code lengths may be different from each other. In this case, one or more bits of the compressed image body data of the compressed image data 22 may be compared with the corresponding bit(s) of the compression code of the transmission data 24 which has been just previously transmitted. FIG. 7 illustrates an operation in such a case.

Illustrated in FIG. 7 is an example in which the compression code length of the transmission data 24 which has been just previously transmitted is three and the compression code length of the compressed image data 22 to be currently transmitted is two. In the just previous transmission of the transmission data 24, the bits $D_{CODE}[0]$-$D_{CODE}[2]$ of the compression code are transmitted over the signal lines $13a_1$ to $13a_3$, and the bits $D_{BODY}[0]$-$D_{BODY}[60]$ of the compressed image body data are transmitted over the signal lines $13a_4$ to $13a_{64}$.

Since the compression code length of the compressed image data 22 to be currently transmitted is two, the transmission data comparator section 32 specifies the signal lines $13a_3$ to $13a_{64}$ to be used for transmitting the compressed image body data or bit-inverted data of the corresponding transmission data 24. Furthermore, the transmission data comparator section 32 compares the respective bits of the compressed image body data of the compressed image data 22 to be currently transmitted with the corresponding bits of the transmission data 24 which has been just previously transmitted over the signal lines $13a_3$ to $13a_{64}$. In the case illustrated in FIG. 7, the most significant bit $D_{BODY}[0]$ of the compressed image body data of the compressed image data 22 to be currently transmitted is compared with the least significant bit $D_{CODE}[2]$ of the compression code of the transmission data 24 which has been just previously transmitted over the signal line $13a_3$, since the signal line $13a_3$ is allocated to the most significant bit $D_{BODY}[0]$ of the compressed image body data. Also in this case, the transmission data comparator section 32 generates the inversion indication signal 52, which indicates whether or not data-bit inversion is to be performed on the compressed image body data, in accordance with the result of this data comparison.

As thus described, in the present embodiment, the compression code of a compressed image data is transmitted without data-bit inversion, while the compressed image body data, which includes bits of the compressed image data other than the compression code, are compared with the data which has been just previously transmitted to determine which of the compressed image body data itself or the bit-inverted data thereof is to be transmitted, in accordance with the result of the data comparison. This effectively reduces the power consumption in transmitting the compressed image data.

Figure 8:
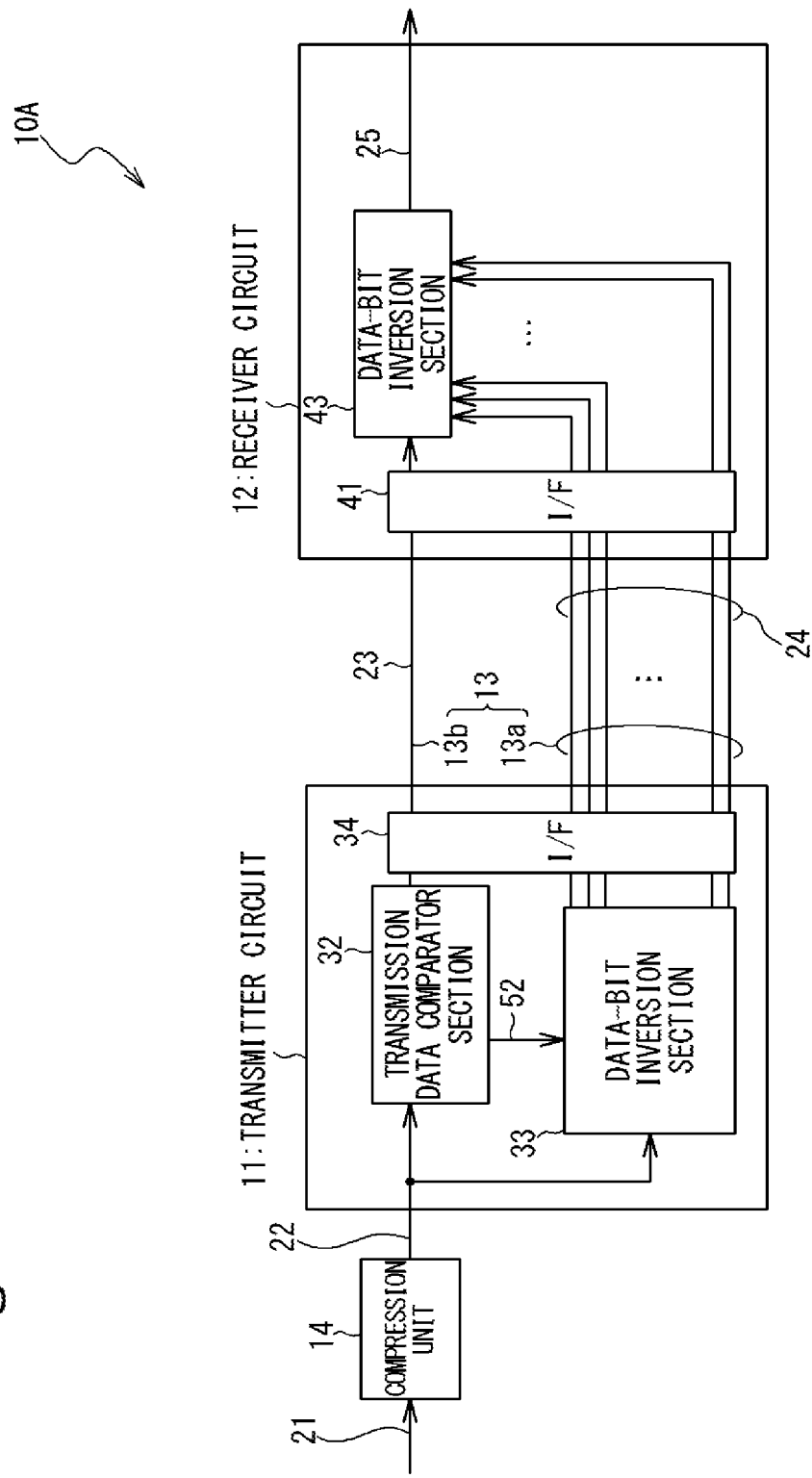
FIG. 8 is a block diagram illustrating an exemplary configuration of an image data transfer system in an embodiment in which the compression code length is fixed.

It should be noted that, although the above-described embodiment is directed to the case where the compression code length is variable, the technique of the present disclosure is applicable to the case where the compression code length is fixed. FIG. 8 is a block diagram illustrating an exemplary configuration of an image data transfer system 10A in an embodiment in which the compression code length is fixed.

The image data transfer system 10A illustrated in FIG. 8 is configured similarly to the image data transfer system 10 illustrated in FIG. 3. The difference is that, in the image data transfer system 10A illustrated in FIG. 8, the compression code length identification section 31 is removed from the transmitter circuit 11 and the compression code length identification section 42 is removed from the receiver circuit 12.

The operation of the image data transfer system 10A illustrated in FIG. 8 is almost similar to that of the image data transfer system 10 illustrated in FIG. 3, except for that identification of the compression code length is not performed. It is not necessary to identify the compression code length upon reception of the compressed image data 22, since the compression code length is fixed.

More specifically, the transmission data comparator section 32 in the transmitter circuit 11 compares the compressed image body data of the compressed image data 22 to be currently transmitted with the data which has been just previously transmitted over the signal lines 13a to be used to transmit the compressed image body data or the bit-inverted data thereof for the compressed image data 22 to be currently transmitted. The transmission data comparator section 32 generates the inversion indication signal 52 to indicate whether data-bit inversion is to be performed on the compressed image body data, in accordance with the result of this data comparison. The generated inversion indication signal 52 is transmitted to the data-bit inversion section 33. Additionally, the transmission data comparator section 32 generates the inversion indication bit 23 in accordance with the result of the data comparison.

The data-bit inversion section 33 sequentially receives compressed image data 22 from the compression unit 14 and generates transmission data 24 to be transmitted to the receiver circuit 12. As described above, the compressed image data 22 each include a compression code and a compressed image body data, and the processing performed in the data-bit inversion section 33 is different between the compression code and the compressed image body data. The data-bit inversion section 33 incorporates the compression code into the transmission data 24 without performing data-bit inversion independently of the inversion indication signal 52 (that is, independently of the result of the data comparison between the compressed image data 22 to be currently transmitted to the receiver circuit 12 with the data which has been just previously transmitted to the receiver circuit 12 over the signal lines 13a.) On the other hand, the data-bit inversion section 33 is responsive to the inversion indication signal 52 for incorporating the compressed image body data into the transmission data 24 without performing data-bit inversion or incorporating the bit-inverted data obtained by performing data-bit inversion on the compressed image body data into the transmission data 24. The transmission data 24 thus generated is transmitted to the receiver circuit 12.

The data-bit inversion section 43 in the receiver circuit 12 reproduces the original compressed image data 22 from the transmission data 24, and outputs the reproduced compressed image data 22 as the reception compressed image data 25. More specifically, when recognizing that the transmission data 24 includes the compression code and the bit-inverted data on the basis of the inversion indication bit 23 received from the transmitter circuit 11, the data-bit inversion section 43 performs data-bit inversion on the bit-inverted data to reproduce the original compressed image body data. The data-bit inversion section 43 outputs the reception compressed image data 25 which incorporates the compression code included in the transmission data 24 and the reproduced compressed image body data. When recognizing that the transmission data 24 is identical to the original compressed image data 22 on the basis of the inversion indication bit 23 received from the transmitter circuit 11, on the other hand, the data-bit inversion section 43 outputs the received transmission data 24 as the reception compressed image data 25 without performing data-bit inversion.

The image data transfer system (10, 10A) of the present embodiment is applicable to various devices and systems in which compressed image data are transferred. In one example, the image data transfer system of the present embodiment may be used for transferring compressed image data within a display driver which drives a display panel.

Figure 9:
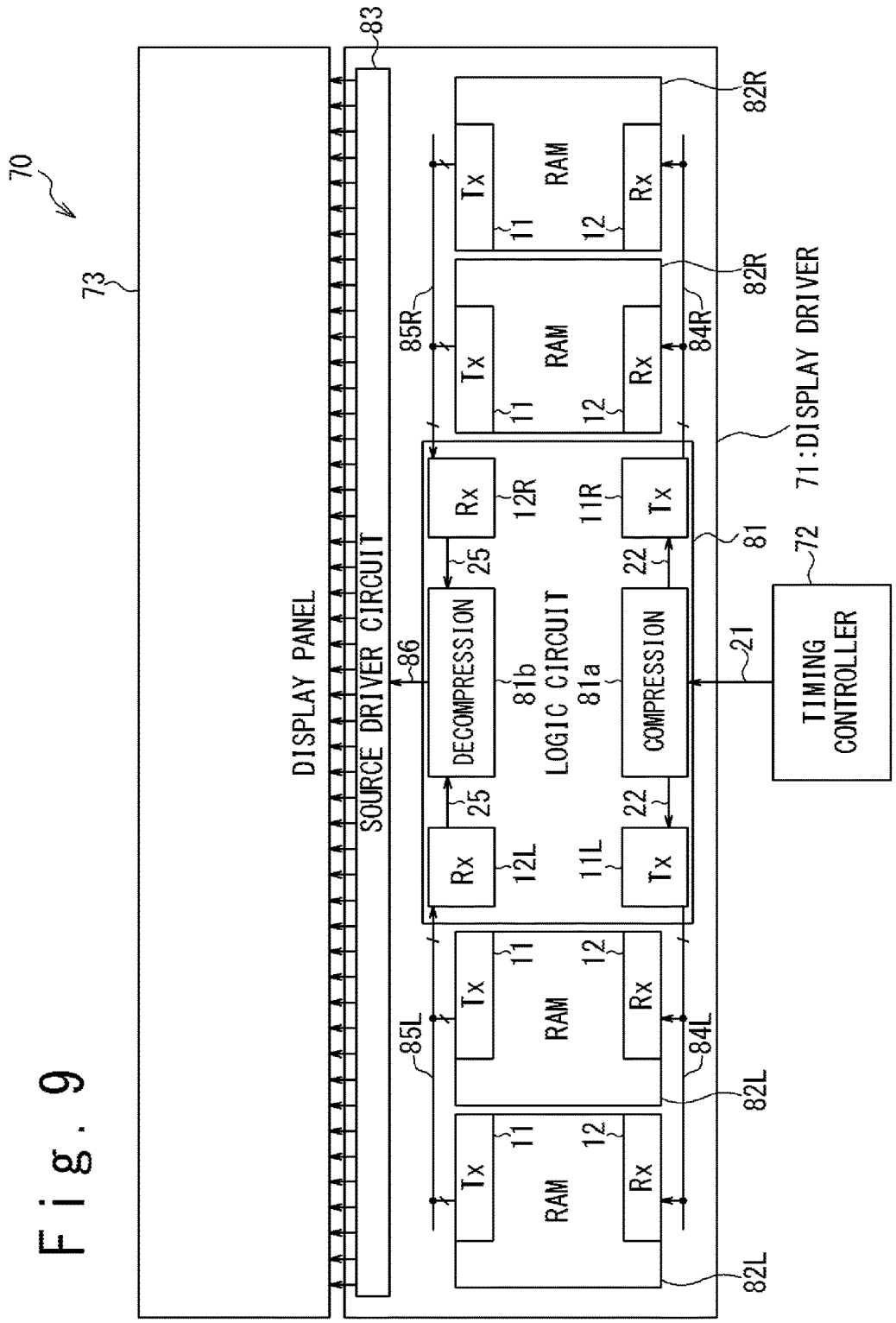
FIG. 9 is a block diagram illustrating an exemplary configuration of a display device in which the image data transfer system of the present embodiment is used to transmit compressed image data within a display driver IC.

FIG. 9 is a block diagram illustrating an exemplary configuration of a display device 70 in which the image data transfer system (10, 10A) of the present embodiment is used to transfer compressed image data within a display driver IC 71. The display driver IC 71 is configured to receive image data 21 from a timing controller 72 and drive a display panel 73 (e.g. a liquid crystal display panel) to display an image corresponding to the image data 21.

The display device 70 illustrated in FIG. 9 is configured so that the display driver IC 71 generates compressed image data 22 by performing image compression on the image data 21 and distributedly stores the compressed image data 22 into a plurality of storage units, more specifically, a plurality of RAMs (random access memories). Such configuration aims at reducing the total capacity of the storage units (RAMs) integrated in the display driver IC 71. A RAM may be integrated in a display driver IC to temporarily store image data; however such configuration suffers from a problem that the RAM occupies a large area in the display driver IC. The configuration of the display driver 71 illustrated in FIG. 9 effectively reduces the total capacity of the RAMs, since the compressed image data 22 are stored in the RAMs.

More specifically, the display driver IC 71 includes a logic circuit 81, left RAMs 82L, right RAMs 82R, and a source driver circuit 83. The logic circuit 81, the left RAMs 82L, the right RAMs 82R, and the source driver circuit 83 are monolithically integrated in the display driver IC 71. In other words, the logic circuit 81, the left RAMs 82L, the right RAMs 82R, and the source driver circuit 83 are integrated in the same semiconductor chip. The logic circuit 81 is connected to the left RAMs 82L via left buses 84L and 85L and is also connected to the right RAMs 82L via right buses 84R and 85R. Each of the left buses 84L, 85L, the right buses 84R and 85R, which includes a plurality of signal lines, corresponds to the signal lines 13 in the above-described embodiment.

The logic circuit 81 includes a compression circuit 81a, transmitter circuits 11R, 11L, receiver circuits 12R, 12L and a decompression circuit 81b. The transmitter circuits 11R and 11L of the logic circuit 81 are configured similarly to the transmitter circuit 11 of the above-described embodiment and operate in a similar manner to the transmitter circuit 11. The receiver circuits 12R and 12L of the logic circuit 81 are configured similarly to the receiver circuit 12 of the above-described embodiment and operate in a similar manner to the receiver circuit 12.

The compression circuit 81a, which corresponds to the compression unit 14 in the above-described embodiment, is configure to sequentially generate compression image data 22 by performing block compression on the image data 21 sequentially supplied thereto. When performing image compression on the image data 21 associated with each block, the compression circuit 81a selects a desired one of a plurality of compression processes on the basis of the characteristics of the image data 21 associated with each block and generates the corresponding compressed image data 22 by performing the selected compression process on the image data 21 associated with each block.

The transmitter circuit 11L transmits to the left RAMs 82L data to be stored in the left RAMs 82L selected from the compressed image data 22 generated by the compression circuit 81a via the left bus 84L. Similarly, the transmission circuit 11R transmits to the right RAMs 82R data to be stored in the right RAMs 82R selected from the compressed image data 22 generated by the compression circuit 81a via the right bus 84R.

The receiver circuit 12L receives the compressed image data 22 stored in the left RAMs 82L via the left bus 85L and outputs the received compressed image data 22 as the reception compressed image data 25. Similarly, the receiver circuit 12R receives the compressed image data 22 stored in the right RAMs 82R via the right bus 85R and outputs the received compressed image data 22 as the reception compressed image data 25.

The decompression circuit 81b performs a decompression process on the reception compressed image data 25 received from the receiver circuits 12R and 12L to generate decompressed image data 86.

The left RAMs 82L and the right RAMs 82R store therein the compressed image data 22 received from the logic circuit 81. Each of the left RAMs 82L and the right RAMs 82R includes a transmitter circuit 11 and a receiver circuit 12. The transmitter circuits 11 of the left RAMs 82L and the right RAMs 82R are configured similarly to the transmitter circuit 11 of the above-described embodiment and operate in a similar manner. The receiver circuits 12 of the left RAMs 82L and the right RAMs 82R are configured similarly to the receiver circuit 12 of the above-described embodiment and operate in a similar manner. The left RAMs 82L each receive the compressed image data 22 from the transmitter circuit 11L of the logic circuit 81 by using the receiver circuit 12 provided therein and stores the compressed image data 22 thus received. Similarly, the right RAMs 82R each receive the compressed image data 22 from the transmitter circuit 11R of the logic circuit 81 by using the receiver circuit 12 provided therein and stores the compressed image data 22 thus received. Additionally, the left RAMs 82L each transmit the compressed image data 22 stored therein to the receiver circuit 12L of the logic circuit 81 by using the transmitter circuit 11 provided therein. Similarly, the right RAMs 82R each transmit the compressed image data 22 stored therein to the receiver circuit 12R of the logic circuit 81 by using the transmitter circuit 11 provided therein.

The source driver circuit 83 drives the source lines (also referred to as data lines or signal lines) in response to the decompressed image data 86 received from the decompression circuit 81b of the logic circuit 81.

Schematically, the display device 70 illustrated in FIG. 9 operates as follows: When image data 21 are supplied to the display driver IC 71 from the timing controller 72, image compression is performed on the image data 21 by the compression circuit 81a of the logic circuit 81 to generate compressed image data 22. The compressed image data 22 are transmitted to the left RAMs 82L and the right RAMs 82R by the transmitter circuits 11L and 11R and distributedly stored in the left RAMs 82L and the right RAMs 82R.

The display panel 73 is driven in response to the compressed image data 22 stored in the left RAMs 82L and the right RAMs 82R. The compressed image data 22 stored in the left RAMs 82L and the right RAMs 82R are transmitted to the logic circuit 81 and then decompressed by the decompression circuit 81b to generate decompressed image data 86. The source lines of the display panel 73 are driven by the source driver circuit 83 in response to the decompressed image data 86.

The image data transfer system (10, 10A) of the present embodiment is also applicable to various systems in which compressed image data are transferred between two semiconductor ICs. In one example, the image data transfer system (10, 10A) is applicable to transfer of compressed image data from a timing controller IC to a display driver IC which drives a display panel. In general, image data used to display a display panel have a large size and therefore a large amount of power is consumed in a system structure in which image data are transferred from a timing controller to a display driver IC; however, the system structure in which compressed image data obtained by performing image compressed on image data are transferred from the timing controller IC to the display driver IC effectively reduces the data amount of the transfer data to thereby reduce the power consumption.

FIG. 10 is a block diagram illustrating an exemplary configuration of a display device 90 in which the image data transfer system (10, 10A) of the present embodiment is used to transfer compressed image data from a timing controller IC to display driver ICs. The display device 90 of the present embodiment includes a timing controller IC 91, a plurality of display driver ICs 92 and a display panel 93 (for example, a liquid crystal display panel). The display driver ICs 92 are connected to the timing controller IC 91 via a bus 94. The bus 94, which includes a plurality of signal lines, corresponds to the signal lines 13 of the above-described embodiment.

The timing controller IC 91 includes a compression circuit 91a and a transmitter circuit 11. The compression circuit 91a, which corresponds to the compression unit 14 of the above-described embodiment, is configured to perform block compression on the image data 21 sequentially supplied thereto generate decompressed image data 22. When compressing the image data 21 associated with each block, the compression circuit 91a selects a desired one of a plurality of compression processes in response to the characteristics of the image data 21 associated with each block, and generates compressed image data 22 by performing the selected compression process on the image data 21 associated with each block. The transmitter circuit 11 transmits the compressed image data 22 to the display driver ICs 92.

Each of the display driver ICs 92 includes a receiver circuit 12, a decompression circuit 92a and a source driver circuit 92b. The receiver circuit 12 receives the compressed image data 22 from the timing controller IC 91 and outputs the received compressed image data 22 as reception compressed image data to the decompression circuit 92a. The decompression circuit 92a decompresses the reception compressed image data received from the receiver circuit 12 to generate decompressed image data. The source driver circuit 92b drives the source lines of the display panel 93 in response to the decompressed image data received from the decompression circuit 92a.

Although various embodiments of the present disclosure have been specifically described in the above, the present disclosure must not be construed as being limited to the above-described embodiments. A person skilled in the art would appreciate that the present disclosure may be implemented with various modifications.

For example, the transmitter circuit 11 is configured to incorporate the compression code of each compressed image data 22 into the transmission data 24 without change in the above-described embodiments, the transmitter circuit 11 may be instead configured to incorporate into the transmission data 24 a data equivalent to the compression code, for example, an arithmetic operation data obtained by performing a predetermined arithmetic operation on the compression code. When an arithmetic operation data equivalent to the compression code of the compressed image data 22 is incorporated to the transmission data 24, the arithmetic operation data is generated with a predetermined arithmetic operation which does not depend on the result of the data comparison of the bits of the compressed image body data with data which has been just previously transmitted over the signal lines 13 allocated to the compressed image body data or the bit-inverted data. For example, bit-inversion may be unconditionally performed on the compression codes of all of the compressed image data 22. In this case, the logical arithmetic data obtained through the bit-inversion may be incorporated into the transmission data 24.

Also, although the receiver circuit 12 is configured to incorporate the compression code included in each transmission data 24 into the reception compressed image data 25 without change in the above-described embodiments, the receiver circuit 12 may be configured to incorporate into the reception compressed image data 25 a data equivalent to the compression code included in each transmission data 24 (or the arithmetic operation data equivalent to the compression code included in the compressed image data 22), for example, an arithmetic operation data obtained by performing a predetermined arithmetic operation on the compression code. When an arithmetic operation data equivalent to the compression code of the transmission data 24 is incorporated in the reception compressed image data 25, the arithmetic operation data is generated through a predetermined arithmetic operation which does not depend on the inversion indication bit 23. When an arithmetic operation data equivalent to the compression code of a compressed image data 22 is incorporated into the corresponding transmission data 24, the arithmetic operation data is generated through a predetermined arithmetic operation which does not depends on the result of data comparison of the compressed image body data of the compressed image data 22 with the data which has been just previously transmitted over the signal lines 13a allocated to the compressed image body data or the bit-inverted data thereof. Especially, when each transmission data 24 includes an arithmetic operation data equivalent to the compression code included in the compressed image data 22, the original compression code reproduced by the arithmetic operation data may be incorporated into the reception compressed image data 25.

It is apparent that the present disclosure is not limited to the above-described embodiments, which may be modified and changed without departing from the scope of the disclosure.

What is claimed is:

1. An image data transfer system, comprising:
a receiver; and
a transmitter coupled with the receiver via a plurality of signal lines, wherein the transmitter is configured to:
   receive compressed image data including a compressed image body data and a compression code indicating a compression process used to generate the compressed image data;
   perform a bitwise comparison of the compressed image body data with a portion of a preceding transmission data that was transmitted to the receiver;
   select, based on the bitwise comparison, one of the compressed image body data and a bit-inverted copy thereof; and
   transmit to the receiver a current transmission data, wherein transmitting the current transmission data comprises:
      transmitting the compression code using a first set of one or more signal lines of the plurality of signal lines; and
      transmitting the selected one of the compressed image body data and the bit-inverted copy using a second set of one or more signal lines of the plurality of signal lines,
      wherein the one or more signal lines of the first set are distinct from the one or more signal lines of the second set.

2. The image data transfer system according to claim 1, wherein the transmitter is further configured to:
   incorporate the selected one of the compressed image body data and the bit-inverted copy into the current transmission data in response to the bitwise comparison; and
   incorporate, when the bit-inverted copy is incorporated into the current transmission data, the compression code of the compressed image data into the current transmission data without performing bit-inversion on the compression code.

3. The image data transfer system according to claim 1, wherein the transmitter is further configured to transmit an inversion indication bit indicating the selected one of the compressed image body data and the bit-inverted copy to the receiver,
   wherein the receiver is configured to receive the current transmission data and output reception compressed image data, and
   wherein the receiver is further configured to, in response to the inversion indication bit, incorporate into the reception compressed image data a selected one of the compressed image body data included in the current transmission data and data obtained by performing a bit-inversion on the bit-inverted copy included in the current transmission data.

4. The image data transfer system according to claim 3, wherein the receiver is further configured to incorporate the compression code included in the current transmission data into the reception compressed image data independently of the inversion indication bit.

5. The image data transfer system according to claim 3, wherein the receiver is further configured to incorporate the compressed image body data included in the current transmission data into the reception compressed image data, when the inversion indication bit indicates the compressed image body data.

6. The image data transfer system according to claim 3, wherein the receiver is further configured to incorporate the data obtained by performing the bit-inversion on the bit-inverted copy into the reception compressed image data, when the inversion indication bit indicates the bit-inverted copy.

7. The image data transfer system according to claim 3, wherein the receiver is further configured to identify a number of bits of the compression code included in the current transmission data, and incorporate into the reception compressed image data a selected one of the compressed image body data included in the current transmission data and data obtained by a bit-inversion of the bit-inverted copy included in the current transmission data, in response to the inversion indication bit and the identified number of bits of the compression code.

8. The image data transfer system according to claim 7, wherein the receiver is further configured to incorporate the compression code included in the current transmission data into the reception compressed image data, independently of the inversion indication bit.

9. The image data transfer system according to claim 1, wherein the compression process used to generate the compressed image data is selected from a plurality of compression processes.

10. The image data transfer system according to claim 9, wherein a number of bits of the compression code depends on the selection of the plurality of compression processes,
wherein the transmitter is further configured to identify the number of bits of the compression code of the compressed image data, and select signal lines over which the selected one of the compressed image body data and the bit-inverted copy is transmitted, based on the identified number of bits of the compression code, and
wherein the transmitter is further configured to, in the bitwise comparison, compare bits of the compressed image body data of the compressed image data with corresponding bits of the preceding transmission data, the corresponding bits having been transmitted over the selected signal lines.

11. The image data transfer system according to claim 10, wherein the bitwise comparison is not performed with respect to the compression code of the compressed image data.

12. The image data transfer system according to claim 1, further comprising:
compression circuitry configured to receive an image data, select the compression process used to generate the compressed image data from a plurality of compression processes in response to characteristics of the image data, and generate the compressed image data by performing the selected compression process.

13. A transmitter, comprising:
circuitry configured to:
receive compressed image data including a compressed image body data and a compression code indicating a compression process used to generate the compressed image data;
perform a bitwise comparison of the compressed image body data with a preceding transmission data that was transmitted to a receiver using a plurality of signal lines; and
select, based on the bitwise comparison, one of the compressed image body data and a bit-inverted copy thereof; and
an interface coupled with the circuitry, wherein the interface is configured to transmit to the receiver a current transmission data, wherein transmitting the current transmission data comprises:
transmitting the compression code using a first set of one or more signal lines of the plurality of signal lines; and
transmitting the selected one of the compressed image body data and the bit-inverted copy using a second set of one or more signal lines of the plurality of signal lines,
wherein the one or more signal lines of the first set are distinct from the one or more signal lines of the second set.

14. The transmitter according to claim 13, wherein the circuitry is further configured to:
incorporate the selected one of the compressed image body data and the bit-inverted copy into the current transmission data, in response to the bitwise comparison, and
incorporate, when the bit-inverted copy is incorporated into the current transmission data, the compression code of the compressed image data into the current transmission data without performing bit-inversion on the compression code.

15. The transmitter according to claim 13, wherein the circuitry is further configured to transmit an inversion indication bit indicating the selected one of the compressed image body data and the bit-inverted copy to the receiver.

16. The transmitter according to claim 13, wherein the compression process used to generate the compressed image data is selected from a plurality of compression processes.

17. The transmitter according to claim 16, wherein a number of bits of the compression code depends on the selection of the plurality of compression processes,
wherein the circuitry is further configured to identify the number of bits of the compression code of the compressed image data, and select signal lines over which the selected one of the compressed image body data and the bit-inverted copy, based on the identified number of bits of the compression code, and
wherein the circuitry is further configured to, in the bitwise comparison, compare bits of the compressed image body data of the compressed image data with corresponding bits of the preceding transmission data, the corresponding bits having been transmitted over the selected signal lines.

18. A receiver, comprising:
an interface configured to externally receive, via a plurality of signal lines coupled with a transmitter, an inversion indication bit and a transmission data generated from a compressed image data; and
circuitry configured to output reception compressed image data corresponding to the received transmission data in response to the inversion indication bit,
wherein the compressed image data is generated through a compression process and includes a compressed image body data and a compression code indicating the compression process,
wherein the transmission data includes the compression code received using a first set of one or more signal lines of the plurality of signal lines, and a selected one of the compressed image body data and a bit-inverted copy thereof received using a second set of one or more signal lines of the plurality of signal lines,
wherein the one or more signal lines of the first set are distinct from the one or more signal lines of the second set,
wherein the inversion indication bit indicates the selected one of the compressed image body data and the bit-inverted copy,
wherein the circuitry is configured to, in response to the inversion indication bit, incorporate into the reception compressed image data a selected one of the compressed image body data included in the transmission data and data obtained by performing bit-inversion on the bit-inverted copy included in the transmission data, and incorporate, when the bit-inverted copy is indicated by the inversion indication bit, the compression code included in the transmission data into the reception compressed image data without performing bit-inversion on the compression code.

19. The receiver according to claim 18, wherein the circuitry is further configured to incorporate the data obtained by performing the bit-inversion on the bit-inverted copy into the reception compressed image data, when the inversion indication bit indicates the bit-inverted copy.

20. The receiver according to claim 18, wherein the circuitry is further configured to identify a number of bits of the compression code included in the transmission data and identify in the transmission data the compression code and the selected one of the compressed image body data and the bit-inverted copy, based on the identified number of bits of the compression code.

\* \* \* \* \*